United States Patent [19]

Wethern

[11] 4,445,817
[45] May 1, 1984

[54] PROPELLER CONSTRUCTION

[76] Inventor: Richard J. Wethern, 13380 SW. Farmington Rd., Beaverton, Oreg. 97005

[21] Appl. No.: 290,608

[22] Filed: Aug. 6, 1981

[51] Int. Cl.³ .............................................. B64C 11/16
[52] U.S. Cl. ................................ 416/227; 416/132 A; 416/212 R; 416/231 R; 416/DIG. 3
[58] Field of Search ........ 416/227 A, 227 R, DIG. 3, 416/212 R, 213 R, 213 A, 231 R, 234 R, 234 A, 132 A, 132 R

[56] References Cited

U.S. PATENT DOCUMENTS

| 181,196 | 8/1876 | Nysewander | 416/13 |
| 430,796 | 6/1890 | Barclay | 416/227 A |
| 547,210 | 10/1895 | Haussmann | 416/231 |
| 1,041,913 | 10/1912 | Tyson | 416/DIG. 3 |
| 1,459,160 | 6/1923 | Nims | 416/DIG. 3 |
| 2,098,107 | 11/1937 | Preston | 416/227 A |
| 2,552,651 | 5/1951 | Skold | 416/231 |
| 2,996,120 | 8/1961 | McGregor | 416/DIG. 3 |
| 3,306,588 | 2/1967 | Reid | 416/227 |

FOREIGN PATENT DOCUMENTS 406691 12/1909 France .......................... 416/227 A Primary Examiner—Stephen Marcus
Assistant Examiner—Kwon John
Attorney, Agent, or Firm—James D. Givnan, Jr.

[57] ABSTRACT

A propeller formed from pliable sheet material with each blade being of looped configuration in plan view. An end segment of each blade is turned inwardly and attached to an inner segment of an adjacent blade at a point offset from the propeller hub portion. A blade root of each blade is of reduced width and extends between a blade inner segment and the propeller hub portion which is apertured to receive a motor output shaft having frictionally engaged disks thereon which oppositely abut the hub portion for shaft attachment purposes.

4 Claims, 9 Drawing Figures

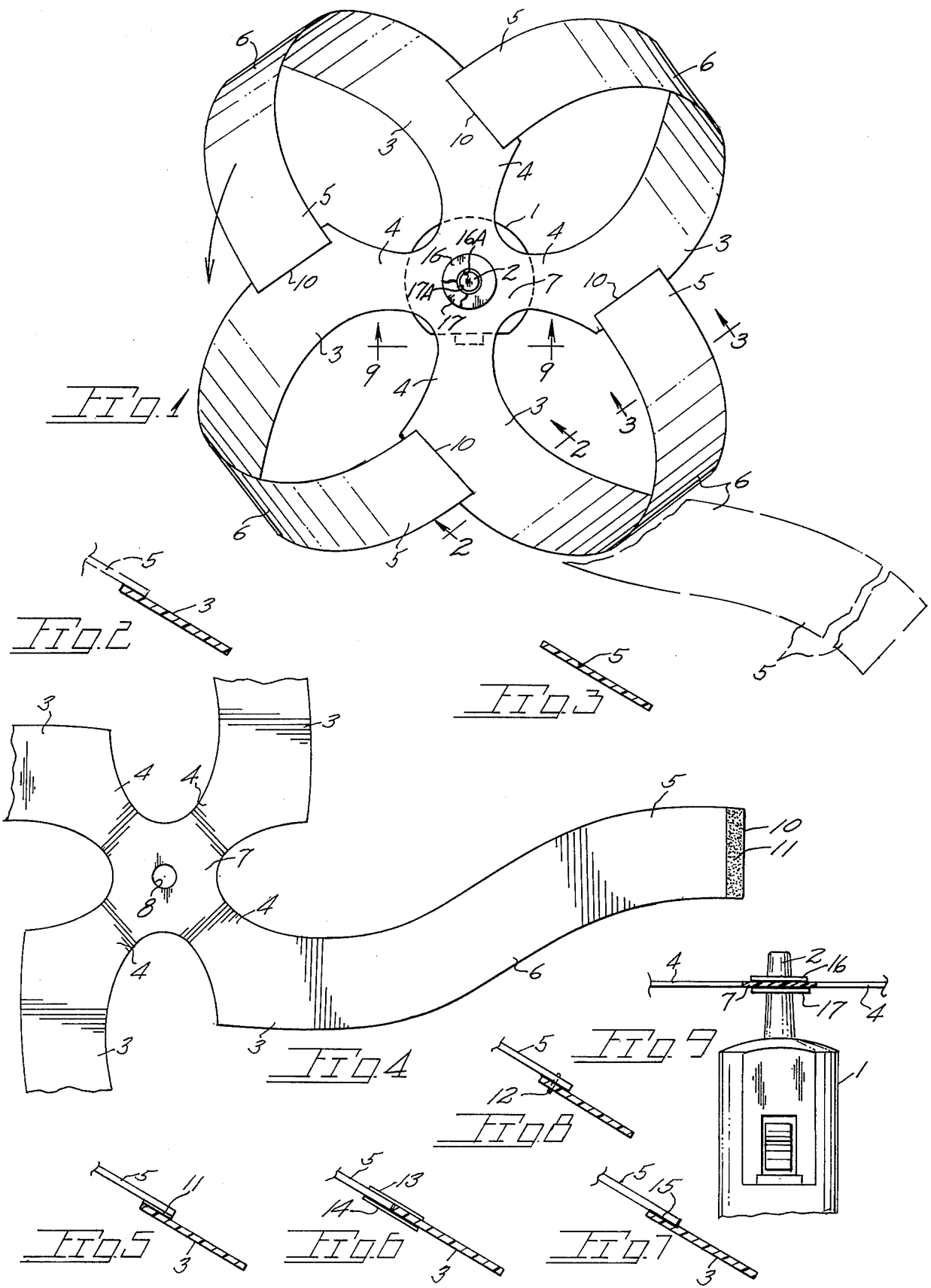

PROPELLER CONSTRUCTION

BACKGROUND OF THE INVENTION

The present invention relates generally to propeller construction and particularly to one having blades of generally looped configuration.

Shown to be old by the prior art are propellers and fan blade wheels having blade members formed in a looped or closed configuration with the blade ends being attached to a propeller or fan wheel hub and the outermost segment of the blade being curvilinear. The prior art blades are typically symmetrically formed from metal strips. Disadvantages to known blade designs are their complexity and consequent cost of manufacture.

U.S. patents disclosing propellers or fan wheels with the above noted features are U.S. Pat. Nos. 46,004; 467,323; 467,824 and 2,552,651. U.S. Pat. No. 2,576,294 shows an aircraft propeller having blade ends joined by a web.

SUMMARY OF THE PRESENT INVENTION

The present invention is embodied within a propeller lending itself to low cost manufacture from sheet material.

The present propeller may be formed from pliable sheet stock of the type and thickness to permit manual shaping of the blade during manufacture. Each blade of the propeller is initially die cut to form an elongate member of irregular shape. When completed, each blade of the present propeller has a somewhat looped configuration (in plan view) to provide, in effect, multiple air foils per blade both of which are similarly inclined to a plane normal to the axis of propeller rotation. An end segment of each blade is adapted for securement to the inner portion of an adjacent blade, such as for example, by adhesive or a mechanical fastener. Each blade is attached to a propeller hub by a reduced blade root.

Important objects include the provision of a propeller having blades of looped configuration each configured so as to permit one blade to be secured to an inner blade segment of an adjacent blade to avoid complex hub structure; the provision of a propeller which lends itself to low cost fabrication from pliable sheet material to provide a fan blade wheel permitting injury-free accidental contact with a person; the provision of a propeller having blades, blade roots and a hub all formed from a sheet of material by a low cost stamping operation; the provision of a propeller which may be economically coupled to the driven shaft of a fan motor using fastener elements in friction tight engagement with said shaft; the provision of a propeller of low production cost and one readily attachable to a motor output shaft to provide a low cost personal use fan.

BRIEF DESCRIPTION OF THE DRAWING

In the accompanying drawing:

FIG. 1 is a plan view of a propeller embodying the present invention in place on the output shaft of a small electric motor;

FIG. 2 is a sectional view taken along line 2—2 of FIG. 1;

FIG. 3 is a sectional view taken along line 3—3 of FIG. 1;

FIG. 4 is a fragmentary plan view of the present propeller subsequent to a forming operation;

FIGS. 5, 6, 7, and 8 are similar to FIG. 2 but show modified forms of coupling adjacent blades to one another; and FIG. 9 is a vertical elevational view taken approximately along line 9—9 of FIG. 1.

DETAILED DESCRIPTION OF THE PREFERRED EMBODIMENT

With continuing reference to the drawing wherein applied reference numerals indicate parts similarly hereinafter identified, the reference numeral 1 in FIGS. 1 and 9 indicates an elongate motor housing having a powered output shaft 2 to which is attached the present propeller. Motor housing 1 may also include a battery storage capability such as found in motor housings of miniature personal electric fan units. While referred to as a propeller, it is to be understood that the term "propeller" comprehends both air and water applications of the present invention.

For ease of understanding the following description of one blade is equally applicable to all blades of the propeller the number of which blades may vary in different embodiments.

A first blade segment at 3 is integral with a blade root at 4 the latter of lesser transverse dimension than the blade. A secondary blade segment is indicated at 5 and in completed form extends inwardly from the blade's outermost curved segment at 6. Said second blade segment extends inwardly for substantially right angular attachment to the first segment of an adjacent primary or first blade segment.

With attention to FIGS. 1 and 4, a blade hub area is indicated at 7 which area defines an opening 8 for motor shaft attachment purposes. Each blade root 4 merges at one end with hub 7 while its remaining or outer end is integral with the inner end of the first segment 3 of each blade.

With continuing attention to FIG. 4, it will be seen that the propeller cut from sheet stock has planar blades each of reverse curvature so as to position a blade end 10 for convenient inward repositioning and attachment to the first or primary blade segment 3 of an adjacent blade. Such attachment results in blades segments 3 and 5 being transversely inclined (blade pitch) in a like degree to a plane normal to the propeller axis of rotation. The pitch angles of blade segments 3 and 5 progressively increase outwardly toward mergence with outermost curved or folded segment 6.

In the preferred embodiment of the invention coupling means is a pressure sensitive adhesive material at 11 on a blade end 10 to enable coupling thereof to an adjacent blade inner segment 3 simply by fingertip pressure. If so desired, adhesive material 11 may be dispensed with and instead a mechanical coupling, such as a staple 12 (FIG. 8) may be applied for the above noted attachment purposes. Additional coupling means are disclosed in FIGS. 6 and 7 wherein attachment is achieved by upper and lower adhesive strips 13 and 14 or, per FIG. 8, fusing of blade material at 15.

For purposes of propeller attachment to output shaft 2 of a small fan motor, I provide apertured disk members 16 and 17 which frictionally engage, at their inner peripheries 16A–17A, the tapered output shaft 2 to secure sandwiched hub portion 7 therebetween. Accordingly, propeller securement to the output shaft of a fan motor may be rapidly accomplished without the aid of costly fasteners to contribute to the low production cost of a personal miniature fan unit.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A propeller formed from pliable sheet material and adapted for attachment to a motor output shaft, said propeller comprising, a planer hub portion apertured for attachment to said motor output shaft, and blades carried by said hub portion with each blade comprising a root integral with said hub portion, a blade end, an inner segment integral with and angularly orientated to said root, each blade being of generally folded configuration so as to locate said blade end proximate the inner segment of an adjacent blade, means attaching the blade end to the inner segment of the adjacent blade at a point offset from the root of the adjacent blade.

2. The propeller claimed in claim 1 wherein said blade root of each blade is of a lesser transverse dimension than the remaining portion of the blade.

3. The propeller claimed in claim 2 wherein each of said blades when in a planer partially formed state has segments of reverse curvature.

4. The propeller claimed in claim 1 wherein said hub portion is centrally apertured, and including disk members above and below said hub portion in abutment therewith and for frictional engagement with the powered output shaft to secure the hub portion to said shaft.

* * * * *